US008161456B2

(12) United States Patent
Bojjireddy et al.

(10) Patent No.: US 8,161,456 B2
(45) Date of Patent: Apr. 17, 2012

(54) MANAGEMENT OF HETEROGENEOUS SOFTWARE ARTIFACTS THROUGH A COMMON REPRESENTATION

(75) Inventors: Karunakar Bojjireddy, Apex, NC (US); Carroll E. Fulkerson, Jr., Raleigh, NC (US); Jim A. Laredo, Katonah, NY (US); Gregory J. Rosensteel, Chappaqua, NY (US); Amber Roy Chowdhury, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1357 days.

(21) Appl. No.: 11/755,072

(22) Filed: May 30, 2007

(65) Prior Publication Data

US 2008/0301641 A1 Dec. 4, 2008

(51) Int. Cl.
*G06F 9/45* (2006.01)
(52) U.S. Cl. ...................................................... 717/121
(58) Field of Classification Search ................... 717/121
See application file for complete search history.

(56) References Cited

U.S. PATENT DOCUMENTS

| | | | | |
|---|---|---|---|---|
| 5,339,435 A * | 8/1994 | Lubkin et al. | ................. | 717/121 |
| 5,966,707 A * | 10/1999 | Van Huben et al. | ................. | 1/1 |
| 6,654,747 B1 * | 11/2003 | Van Huben et al. | ................. | 1/1 |
| 7,124,409 B2 * | 10/2006 | Davis et al. | ................. | 717/178 |
| 7,640,325 B1 * | 12/2009 | DeKoning et al. | ............ | 709/223 |
| 2005/0235262 A1 * | 10/2005 | Burgess | ........................ | 717/120 |
| 2008/0016199 A1 * | 1/2008 | Mooney | ........................ | 709/223 |
| 2008/0320467 A1 * | 12/2008 | Bojjireddy et al. | ........... | 717/174 |

* cited by examiner

*Primary Examiner* — John Chavis
(74) *Attorney, Agent, or Firm* — Yudell Isidore Ng Russell PLLC

(57) ABSTRACT

A method for managing a configuration of heterogeneous software artifacts through a common central configuration representation includes adding a plurality of software artifacts from an initial software solution to a heterogeneous configuration tool. Using this heterogeneous configuration tool, artifact-level configuration parameters are extracted out of selected software artifacts by the heterogeneous configuration tool. The extracted artifact-level configuration parameters are then presented in a single representation. A subset of the presented extracted artifact-level configuration parameters is mapped to a set of solution-level parameters, which are then exposed in a subsequent software solution. Thereafter, parameters for one or more of the solution-level parameters, which are used by the subsequent software solution, are exposed. These parameters for the subsequent software solution are then mapped back to the artifact-level configuration parameters of the subsequent software solution.

6 Claims, 3 Drawing Sheets

MANAGEMENT OF HETEROGENEOUS SOFTWARE ARTIFACTS THROUGH A COMMON REPRESENTATION

BACKGROUND OF THE INVENTION

The present disclosure relates to the field of computers, and specifically to software. Still more specifically, the present disclosure relates to harmonizing configuration parameters found in heterogeneous software artifacts.

Different types of software artifacts each have their own mechanism for specifying configuration information. Sometimes, these are governed by a standard which the artifact adheres to; at other times, it may be an ad-hoc mechanism. Parameters files or eXtensible Markup Language (XML) files are two common approaches to specifying configuration information. In the case of specific software artifacts which use XML for configuration, the XML file may conform to a standard schema. For example, a web.xml file may be used to configure servlets, ejb-jar.xml used to configure EJBs, portlet.xml used to configure portlets, <component-name> component may be used for Service Component Architecture (SCA) components, etc.

There are a number of commonly used semantics associated with configuration parameters, which apply regardless of the specific approach used to specify configuration information. For example, a configuration parameter may be required or optional, have a default value, have constraints on the values it takes, or need to be locked-down or hidden after it is set once. Further, when different artifact types are used to realize a software solution, relationships and constraints may need to be established across the individual configuration parameters associated with each artifact.

Note that a software solution may be realized using multiple parts (software components) that operate in different tiers. For example, consider a mortgage banking solution which is designed to be configured and used by multiple banks, which may have a front end (e.g., a User Interface (UI) into which a customer can enter data), a middle section (e.g., business logic that interfaces between a front-end UI and a back end); and a back end (e.g., a database). These different software components operating in different tiers contain different configuration parameters. Examples of such configuration parameters include the name of the bank, a routing number for the bank, what currency the bank uses, settings to control options on the mortgage process (such as disabling of optional steps), etc. When the components of the software solution are examined, configuration information for each component is exposed. For example, the front end component may expose the configuration information "This is the bank's name" using the front end's configuration parameter for the name of the bank, while the back end may use a different configuration parameter that describes the name of the bank as "bank-name". Such differences in naming of configuration parameters across components are likely to arise because components for different tiers are usually developed by different teams of developers.

Because of the heterogeneity of the software artifacts in a software solution and plethora of configuration parameters associated with the various artifacts, each following their own representation and naming convention, configuring a software solution and making it operational for a particular use (say, for a particular customer), is a human-labor intensive, time consuming process.

BRIEF SUMMARY OF THE INVENTION

A method for managing a configuration of heterogeneous software artifacts through a common central configuration representation includes adding a plurality of software artifacts from an initial software solution to a heterogeneous configuration tool. Using this heterogeneous configuration tool, artifact-level configuration parameters are extracted out of selected software artifacts from the heterogeneous configuration tool. All of the extracted artifact-level configuration parameters are then presented in a single representation. A subset of the presented extracted artifact-level configuration parameters is mapped to a set of solution-level parameters, which are then exposed as part of a subsequent software solution. The extracted artifact-level configuration parameters from the initial software solution are never directly exposed or manipulatable by the subsequent software solution. The exposed solution-level configuration parameters can then be manipulated and set to appropriate values by humans using appropriate tools. These parameters for the subsequent software solution are then mapped back to the artifact-level configuration parameters of the software solution, and the properly configured solution artifacts are readied for installation on target computer systems.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
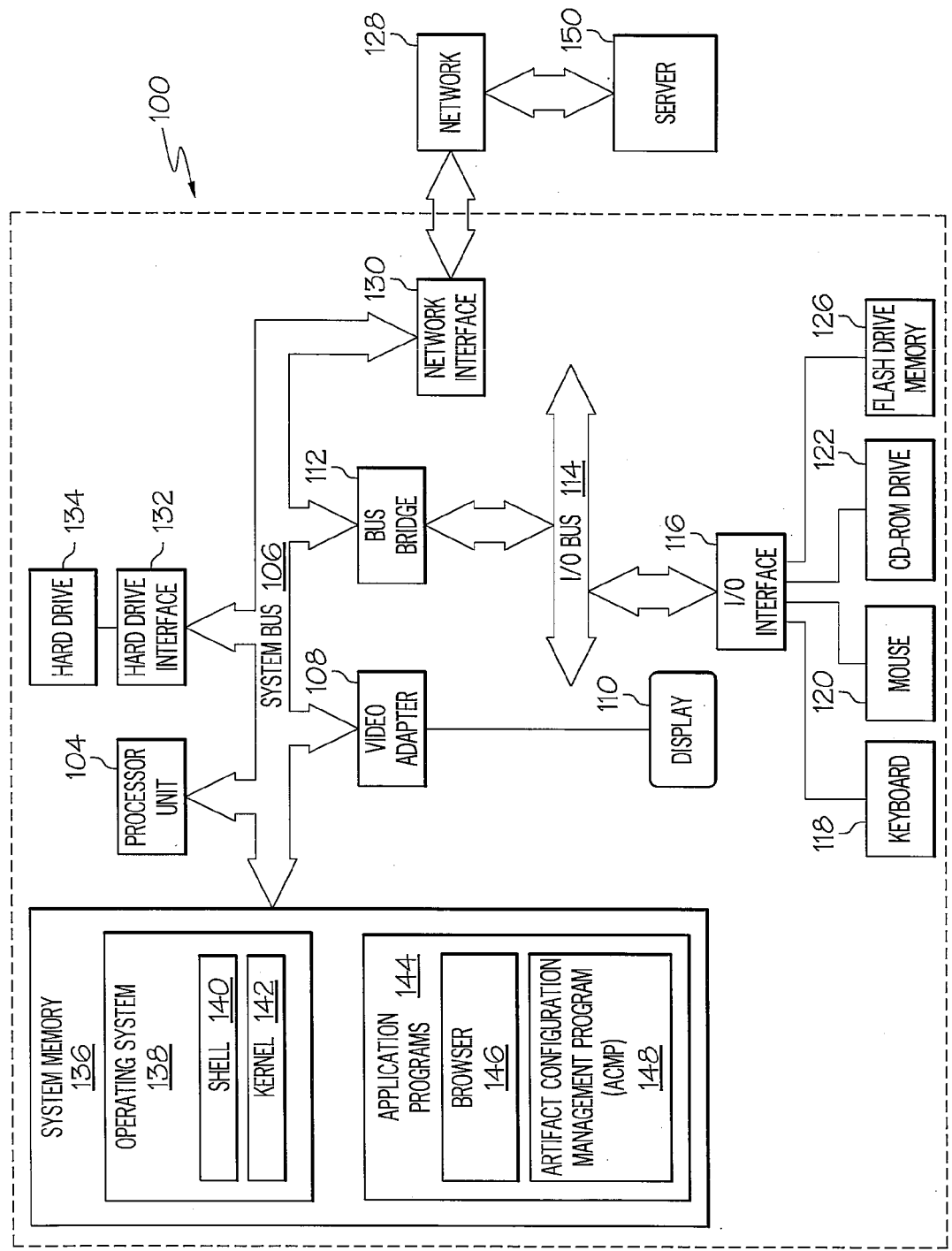
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include an Artifact Configuration Management Program (ACMP) 148. DBWS 148 performs the functions illustrated below in FIG. 3, and may include the Heterogeneous Configuration Tool 204 and RAS Repository 206 shown below in FIG. 2.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
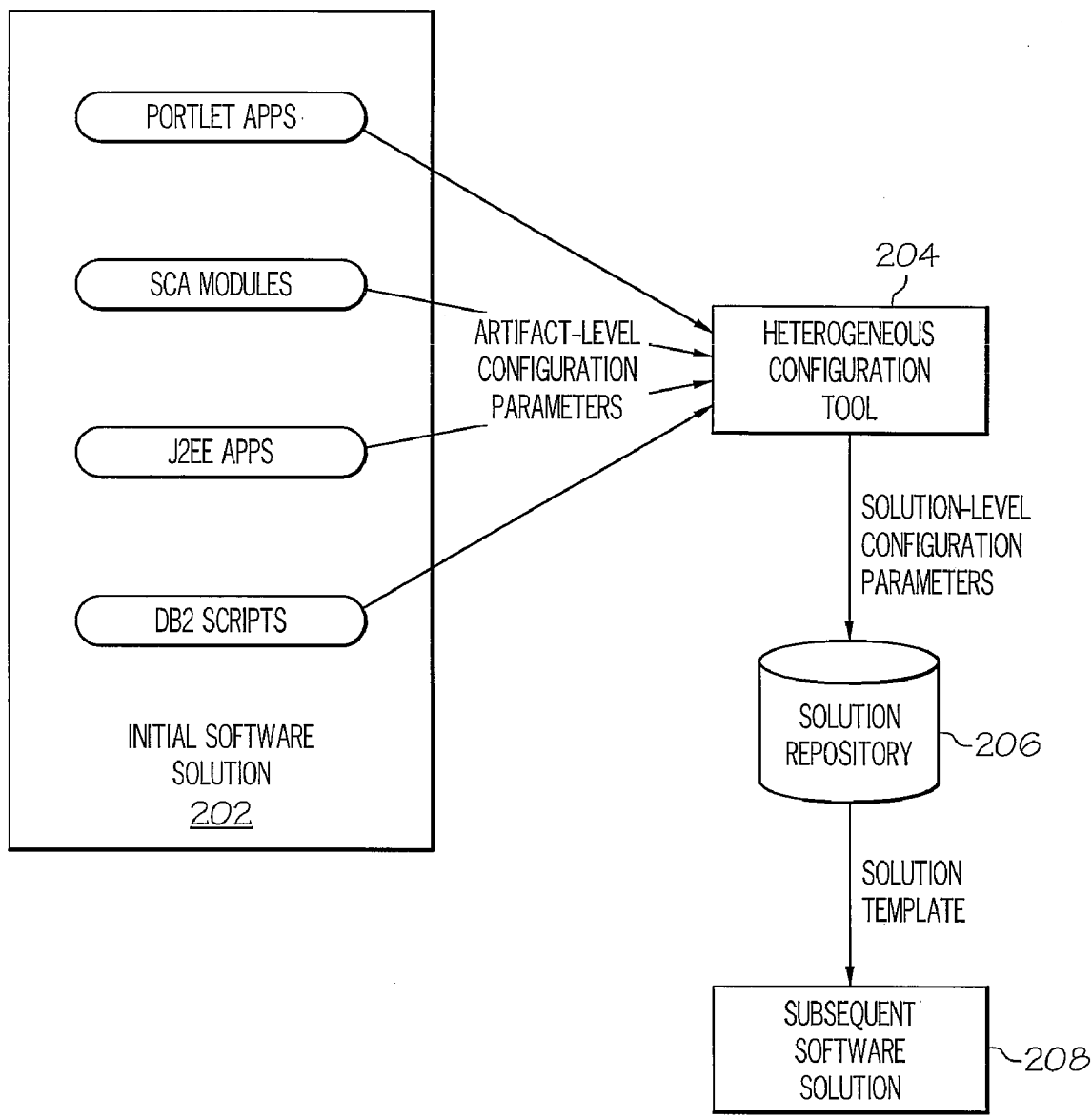
FIG. 2 illustrates a relationship among existing software artifacts and a heterogeneous configuration tool.

With reference now to FIG. 2, an overview of the present invention is presented. An initial software solution 202 may be made up of multiple disparate software artifacts, including the depicted portlet applications, Service Component Architecture (SCA) modules, Java2 Enterprise Edition (J2EE) applications, and DB2 scripts. The artifact-level configuration parameters of these software artifacts are sent to a heterogeneous configuration tool 204. Such configuration parameters include, but are not limited to, variables controlling solution behavior (such as enablement of optional modules), service endpoints, display text, layout characteristics, font type and size etc. In the heterogeneous configuration tool 204, these configuration parameters are mapped to a set of solution-level configuration parameters. The solution together with the solution-level configuration parameters are stored in a solution repository 206 at which point it may be referred to as a solution template. The solution template may then be used to instantiate a subsequent software solution 208, referred to as a solution instance. Note that the artifact-level parameters in the solution instance 208 are kept hidden from tools which are used to further configure the solution instance; such configuration is done by manipulating the solution-level configuration parameters.

The solution instance may undergo several stages of configuration, when some subset of its exposed solution-level parameters is set. At each configuration stage, some solution-level parameters may be hidden, to prevent their being subsequently visible, or marked read-only, to prevent their being subsequently changed. After the final configuration stage, the values configured on the set of solution-level parameters are mapped back to the artifact-level configuration parameters. The configured solution artifacts which comprise the solution instance are then installed on a set of target computer systems.

The number of configuration stages may vary based on the intended use of the solution instances. For example, where the software solution is designed to be instantiated as a service for subscribers, there may be two stages of configuration, the first being used to create a partially configured "service offering" which can then be subscribed to by a customer; and the second being used to complete the remainder of the configuration in accordance with the subscriber's requirements in order to create a "service offering instance".

A single solution template may be used to instantiate multiple solution instances, each of which may be configured differently. For example, in the service delivery scenario introduced in the immediately preceding paragraph above, multiple service offerings may be created out of a single solution template by applying different partial configurations, perhaps reflecting different subsets of function and qualities of service; and multiple service offering instances may be created out of each service offering, by completing the solution configuration in accordance with the subscriber requirements.

The heterogeneous configuration tool 204 may be built using any language and environment. In a preferred embodiment, heterogeneous configuration tool 204 uses Java and Eclipse plugins. A file, called the template.xml file, stores the virtualized solution level parameters and the mapping from each solution level parameter to the artifact level parameters. An example of the template.xml file is shown below:

```xml
<?xml version="1.0" encoding="ASCII"?>
<solutionTemplate:template xmlns:solutionTemplate="http://www.ibm.com/xmlns/prod/CSDP-subsystem">
  <!--Common solution-level metadata -->
<descriptor name="LoanCSDPArchive">
   <description></description>
   <displayName>Loan Sample Solution</displayName>
  </descriptor>
<!-- Create Solution Level Parameters and map them to the parameters extracted from the
Solution Artifacts -->
<!-- Changes made to Solution Parameters will be injected to the associated artifact-level
parameters -->
<!--Begin section on virtualized solution-level parameters -->
<highLevelTemplateParameters>
   <!--First virtualized parameter - bank name -->
   <HighLevelTemplateParameter editable="true" hidden="false" isSequence="true"
name="bankName">
    <description></description>
    <displayName>Name of bank</displayName>
    <value>
     <data>KYBANK</data>
    </value>
    <virtualize>
     <!--These parameters are the parameters associated with the individual solution artifacts
which are virtualized through this high-level parameter -->
     <parameter componentName="LoanStatus" moduleName="LoanStatus"
name="bankname"/>
     <parameter componentName="LoanParameters" moduleName="LoanProcess"
name="bankName"/>
    </virtualize>
   </HighLevelTemplateParameter>
   <!-- Next solution-level parameter - routing number -->
   <HighLevelTemplateParameter editable="true" hidden="false" isSequence="true"
name="bankRoutingNumber">
    <description></description>
    <displayName>Routing number for bank</displayName>
    <value>
     <data>123456789</data>
    </value>
    <virtualize>
     <parameter componentName="LoanParameters" moduleName="LoanProcess"
```

```
name="bankId"/>
    <parameter componentName="LoanStatus" moduleName="LoanStatus"
name="bankroutingno"/>
    </virtualize>
  </HighLevelTemplateParameter>
  <!-- Next solution-level parameter - credit agency -->
  <HighLevelTemplateParameter editable="true" hidden="false" isSequence="true"
name="creditAgency">
    <description></description>
    <displayName>Credit agency to use</displayName>
    <value>
      <data>EXPERIAN</data>
    </value>
    <virtualize>
      <parameter componentName="CreditCheck" moduleName="CreditCheck"
name="creditagency"/>
    </virtualize>
  </HighLevelTemplateParameter>
  </highLevelTemplateParameters>
</solutionTemplate:template>
```

This exemplary code thus illustrates a solution template configuration file that depicts solution-level configuration parameters, and their mapping to artifact-level configuration parameters. Note that in the above, the type of the artifact and the location of the artifact property are not included in the template. This is because the artifacts are assumed to be archived using a standard format which allows the types to be determined from the layout (e.g. portlets are stored in a folder called portlet, with a subfolder named using the portlet name for each portlet, SCA modules are stored in a folder called sca, and so forth). Also, the artifacts each conform to a specific standard, so the location of the properties or xml file relative to the solution artifact packaging is well known. For example, for a portlet, the tool assumes that the configuration file is located in /WEB-INF/portlet.xml within the portlet war file and configuration parameters are mapped to specific elements in portlet.xml (e.g. <portlet-preference>).

The presented code illustrates only one possible implementation, and others are possible without losing the essence of the idea. Instead of the implicit approach for determining the type/location as illustrated, the template schema can be extended to capture this information explicitly, to make the solution more flexible.

Figure 3:
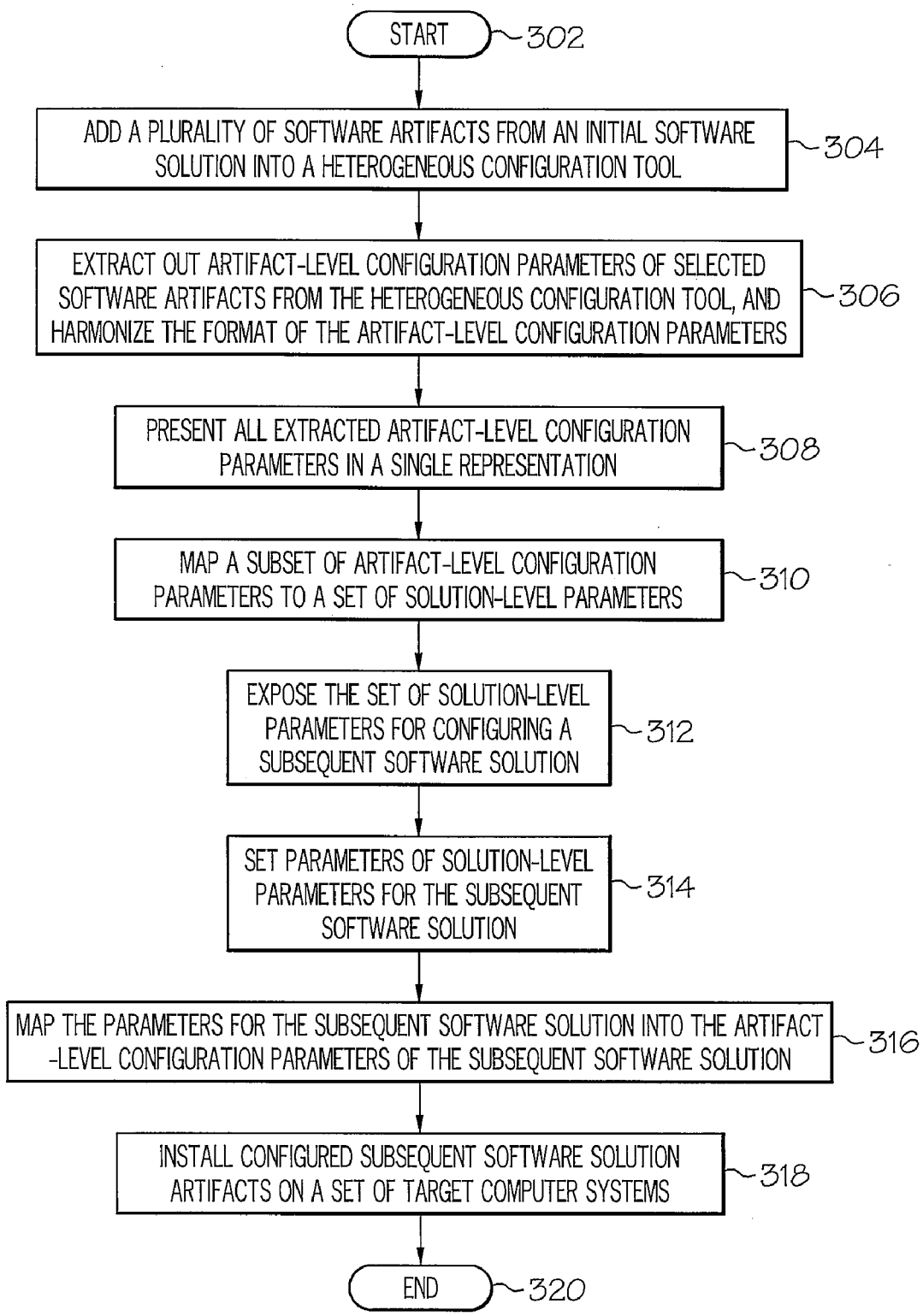
FIG. 3 is a high-level flow-chart of exemplary steps taken to persistently allow artifact configurations from a first software solution to be utilized by a second software solution.

Referring now to FIG. 3, a flow-chart of exemplary steps taken to manage disparate software artifacts is presented. After initiator block 302, a plurality of software artifacts from an initial software solution are added to a heterogeneous configuration tool (block 304). Artifact-level configuration parameters of selected software artifacts are then extracted from the heterogeneous configuration tool (block 306). At this stage, the parameters of disparate artifacts are harmonized. That is, if one software artifact uses "Term A" to describe a configuration feature, while another software artifact uses "Term B" to describe this same configuration feature, then the heterogeneous configuration tool will assign a same "Term C" (which may be "Term A," "Term B" or a new term) to be used for describing this configuration feature.

As shown in block 308, all extracted artifact-level configuration parameters are then presented in a single representation (e.g., a single document). A subset of artifact-level configuration parameters is then mapped to a set of solution-level parameters (block 310). These solution-level parameters are accessible by other software solutions, but the underlying mapped- to artifact-level configuration parameters are not directly accessible. Thus, the subsequent software solution cannot directly manipulate (e.g., change) the artifact-level configuration parameters.

The set of solution-level parameters are then exposed to a subsequent software solution (block 312). Without directly touching the underlying artifact-level configuration parameters, the parameters of the solution-level parameters are then set for the subsequent software solution (block 314). That is, a software administrator sets high-level solution-level configuration parameters (e.g., table sizes, variable names, optional controls, service endpoints, etc.) for the subsequent solution software. These solution-level configuration parameters are then mapped back to the artifact-level configuration parameters of the subsequent software solution (block 316). The configured subsequent software solution artifacts are then installed on a set of target computer systems (block 318). The process ends at terminator block 320.

Note that the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for managing a configuration of heterogeneous software artifacts through a common central configuration representation, the method comprising:
   adding a plurality of software artifacts from an initial software solution to a heterogeneous configuration tool;
   utilizing the heterogeneous configuration tool to extract out artifact-level configuration parameters of selected software artifacts from the heterogeneous configuration tool, wherein at least two of the selected software artifacts are of different artifact types;
   presenting all extracted artifact-level configuration parameters, of the selected software artifacts, in a single representation;
   mapping a subset of the presented extracted artifact-level configuration parameters to a set of solution-level parameters;
   exposing the set of solution-level parameters to a subsequent software solution, wherein the artifact-level configuration parameters from the initial software solution are never directly exposed or manipulatable by the subsequent software solution;
   setting, for the subsequent software solution, parameters for one or more of the solution-level parameters; and
   mapping the parameters for the subsequent software solution back to the artifact-level configuration parameters of the subsequent software solution.

2. The method of claim 1, further comprising:
   setting the subset of the presented extracted artifact-level configuration parameters as a default set of solution-level parameters for the subsequent software solution.

3. A computer program product for managing a configuration of heterogeneous software artifacts through a common central configuration representation, the computer program product comprising: a tangible computer usable medium having computer usable program code embodied therewith, the computer usable program code comprising: computer usable program code configured to add a plurality of software artifacts from an initial software solution to a heterogeneous configuration tool; computer usable program code configured to utilize the heterogeneous configuration tool to extract out artifact-level configuration parameters of selected software artifacts from the heterogeneous configuration tool, wherein at least two of the selected software artifacts are of different artifact types; computer usable program code configured to present all extracted artifact-level configuration parameters, of the selected software artifacts, in a single representation; computer usable program code configured to map a subset of the presented extracted artifact-level configuration parameters to a set of solution-level parameters; computer usable program code configured to expose the set of solution-level parameters to a subsequent software solution, wherein the extracted artifact-level configuration parameters from the initial software solution are never directly exposed or manipulatable by the subsequent software solution; computer usable program code configured to set, for the subsequent software solution, parameters for one or more of the solution-level parameters; computer usable program code configured to map the parameters for the subsequent software solution back to the artifact-level configuration parameters of the initial software solution; and computer usable program code configured to apply the artifact-level configuration parameters to the subsequent software solution.

4. The computer program product of claim 3, further comprising:
   computer usable program code configured to set the subset of the presented extracted artifact-level configuration parameters as a default set of solution-level parameters for the subsequent software solution.

5. A method for managing a configuration of heterogeneous software artifacts through a common central configuration representation, the method comprising:
   adding a plurality of software artifacts from an initial software solution to a heterogeneous configuration tool;
   utilizing the heterogeneous configuration tool to extract out artifact-level configuration parameters of selected software artifacts from the heterogeneous configuration tool, wherein at least two of the selected software artifacts are of different artifact types;
   presenting all extracted artifact-level configuration parameters, of the selected software artifacts, in a single representation;
   mapping a subset of the presented extracted artifact-level configuration parameters to a set of solution-level parameters;
   partitioning development of a subsequent software solution into multiple configuration stages;
   at each of the multiple configuration stages, hiding less than all of the solution-level parameters in order to prevent the solution-level parameters from being altered by a developer of the subsequent software solution;
   setting, for the subsequent software solution, parameters for one or more of the solution-level parameters; and
   mapping the parameters for the subsequent software solution back to the artifact-level configuration parameters of the subsequent software solution.

6. The method of claim 1, further comprising:
   installing the subsequent software solution on a set of target computer systems.

* * * * *